United States Patent
Krebs

(10) Patent No.: US 11,787,169 B2
(45) Date of Patent: Oct. 17, 2023

(54) APPARATUS FOR INSPECTING PRINTED IMAGES AND METHOD FOR VALIDATING INSPECTION ALGORITHMS

(71) Applicant: ELEXIS AG, Wenden (DE)

(72) Inventor: Stephan Krebs, Landsberg Am Lech (DE)

(73) Assignee: ELEXIS AG, Wenden (DE)

( * ) Notice: Subject to any disclaimer, the term of this patent is extended or adjusted under 35 U.S.C. 154(b) by 291 days.

(21) Appl. No.: 16/972,406

(22) PCT Filed: Mar. 30, 2020

(86) PCT No.: PCT/EP2020/058953
§ 371 (c)(1),
(2) Date: Dec. 4, 2020

(87) PCT Pub. No.: WO2020/207841
PCT Pub. Date: Oct. 15, 2020

(65) Prior Publication Data
US 2021/0252850 A1   Aug. 19, 2021

(30) Foreign Application Priority Data
Apr. 12, 2019   (DE) .................. 102019109791.6

(51) Int. Cl.
*G06K 9/00*   (2022.01)
*B41F 33/00*   (2006.01)
(Continued)

(52) U.S. Cl.
CPC ..... *B41F 33/0036* (2013.01); *G01N 21/8901* (2013.01); *G01N 21/898* (2013.01); *G01N 21/93* (2013.01); *G06T 7/001* (2013.01); *G01N 2021/8909* (2013.01); *G01N 2021/8917* (2013.01)

(58) Field of Classification Search
CPC ........... B41F 33/0036; G01N 21/8901; G01N 21/898; G01N 21/93; G01N 2021/8909; G01N 2021/8917; G01N 2021/8816; G06T 7/001
See application file for complete search history.

(56) References Cited

U.S. PATENT DOCUMENTS 8,270,701 B2 * 9/2012 Floeder ................. G06T 7/0006
   382/141
8,376,516 B2 * 2/2013 Viturro ................. B41J 29/393
   347/43
(Continued)

FOREIGN PATENT DOCUMENTS

CN   102105888 A   6/2011
CN   102428355 A   4/2012
(Continued)

*Primary Examiner* — Samir A Ahmed
(74) *Attorney, Agent, or Firm* — Slater Matsil, LLP

(57) ABSTRACT

In an embodiment an apparatus includes an image acquisition device with at least one camera, the image acquisition device configured to acquire a multi-line section of a recording region and an evaluation device configured to process at least two sub-areas of the multi-line section as one strip image each and compare at least two strip images of a test pattern to each other in a validation mode to check whether deviations of the strip images are detected.

11 Claims, 2 Drawing Sheets

(51) Int. Cl.
*G01N 21/89* (2006.01)
*G01N 21/898* (2006.01)
*G01N 21/93* (2006.01)
*G06T 7/00* (2017.01)

(56) References Cited

U.S. PATENT DOCUMENTS

| | | | |
|---|---|---|---|
| 8,611,613 B2* | 12/2013 | Rauscher | B41F 33/0036 |
| | | | 382/112 |
| 8,947,660 B2* | 2/2015 | Jaschul | G01J 3/0254 |
| | | | 356/306 |
| 9,719,939 B2* | 8/2017 | Krebs | G01N 21/8803 |
| 9,953,435 B2* | 4/2018 | Fergen | G06T 7/001 |
| 2011/0069166 A1* | 3/2011 | Rauscher | G06F 18/28 |
| | | | 348/125 |
| 2011/0170762 A1* | 7/2011 | Floeder | G06T 7/0006 |
| | | | 382/141 |
| 2012/0013733 A1 | 1/2012 | Koltermann et al. | |
| 2012/0105860 A1* | 5/2012 | Jaschul | G01J 3/0254 |
| | | | 356/456 |
| 2015/0077538 A1* | 3/2015 | Krebs | B41F 33/0036 |
| | | | 348/88 |
| 2015/0273816 A1* | 10/2015 | Schumann | G06T 7/001 |
| | | | 382/112 |
| 2017/0256047 A1 | 9/2017 | Schumann | |
| 2019/0122352 A1 | 4/2019 | Krebs | |

FOREIGN PATENT DOCUMENTS

| | | |
|---|---|---|
| CN | 102971619 A | 3/2013 |
| CN | 104246483 A | 12/2014 |
| CN | 106881956 A | 6/2017 |
| DE | 69300199 T2 | 11/1995 |
| DE | 102005010552 A1 | 9/2006 |
| DE | 102005059656 A1 | 6/2007 |
| DE | 102012101310 B3 | 4/2013 |
| DE | 102016204506 A1 | 10/2016 |
| DE | 102015114575 A1 | 3/2017 |
| DE | 102016203392 B3 | 6/2017 |
| DE | 102016100437 A1 | 7/2017 |
| EP | 2127878 | * 12/2009 |
| EP | 2407309 A2 | 1/2012 |
| EP | 2927868 A1 | 10/2015 |
| TW | 201400800 A | 1/2014 |
| WO | 2017121627 A1 | 7/2017 |

* cited by examiner

APPARATUS FOR INSPECTING PRINTED IMAGES AND METHOD FOR VALIDATING INSPECTION ALGORITHMS

This patent application is a national phase filing under section 371 of PCT/EP2020/058953, filed Mar. 30, 2020, which claims the priority of German patent application 102019109791.6, filed Apr. 12, 2019, each of which is incorporated herein by reference in its entirety.

TECHNICAL FIELD

Apparatus for inspecting printed images for a printing or finishing machine and method for validating inspection algorithms of an apparatus for inspecting printed images.

BACKGROUND

Such an apparatus for inspecting printed images is known from German Patent Application No. 102012101310 A1, for example. It is used for the inspection of labels, for example, which are arranged on a carrier and are moved at high speed through a recording region of the apparatus for inspecting printed images. During this process the printed image is checked for defects.

Generally, the problem with print inspection systems is that it must be ensured that the inspection algorithms, including parameterization, have a specified sensitivity. However, the principle of error detection is not error-tolerant, i.e. if the inspection algorithms do not indicate an error, this means either that there are no defects or that they cannot be found with the current settings. For conventional systems, therefore, a sample roll with artificially introduced defects must be provided, which is then used to validate the inspection settings. This process is very time-consuming and due to abrasion, the sample roll must be replaced regularly, which involves additional costs.

German Patent Application No. 10 2016 100 437 A1 further discloses an apparatus for inspecting printed images that has a second illumination unit, whereby both illumination units are of different types.

SUMMARY OF THE INVENTION

Embodiments provide an apparatus for inspecting printed images, in which the validation is simplified. A suitable method shall also be indicated.

Embodiments provide an apparatus of the type mentioned above, which is characterized by an evaluation device, which is adapted to process at least two partial areas of the multi-line section as one strip image each, and has a validation mode, in which at least two strip images of a test image are compared with each other to check whether deviations of the strip images are detected.

An advantage of the apparatus for inspecting printed images is that the validation can be carried out on the basis of a static, i.e. standing image. While conventional systems require a moving test roll, the device can, for example, use a stencil with a test image which is placed in the image recording region of the apparatus for inspecting printed images. Due to the use of a camera with a multi-line image area, it is possible to capture two or more strip images without the need to move the test image.

In advantageous embodiments, a control device is provided and set up to set the evaluation device into validation mode according to a predefined time schedule, based on sensor measurement values, when a web change occurs or a test image is detected.

The test image is designed in such a way that a correct image is shown in a first area and a deviating image with one or more defects in a second area. During validation it is checked whether the defects built into the second area are correctly detected.

Regarding a method, the objective is solved by a method for validation of the inspection algorithms of an apparatus for inspecting printed images for a printing or finishing machine for continuously moving printed products based on matrix cameras with the steps

- placing a stencil in a recording region, the stencil comprising an area with a first pattern and an area with a second pattern, the first pattern having a defined deviation from the second pattern,
- acquisition of a first multi-line strip image to capture at least one section of the first pattern,
- acquisition of a second strip image to capture at least one section of the second pattern,
- comparison of the first strip pattern with the second strip pattern and evaluation whether the deviations between the first and the second pattern are detected.

BRIEF DESCRIPTION OF THE DRAWINGS

The invention is explained in more detail below using figures.

DETAILED DESCRIPTION OF ILLUSTRATIVE EMBODIMENTS

Figure 1:
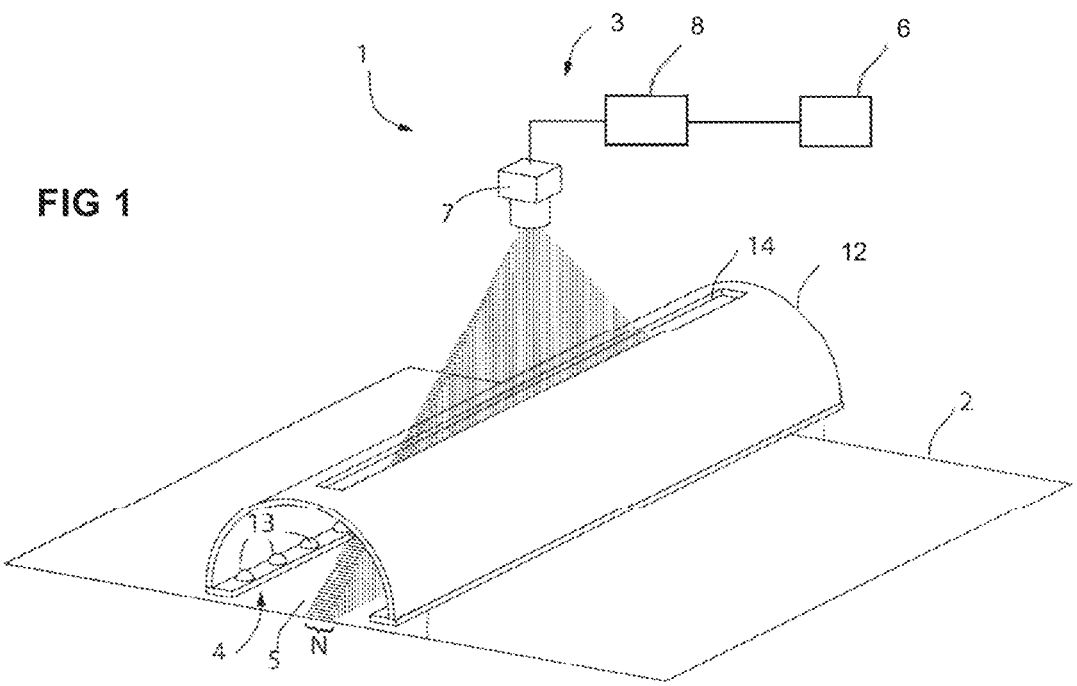
FIG. 1 shows a schematic representation of an apparatus for inspecting printed images with a matrix camera.

FIG. 1 shows an apparatus 1 for inspecting printed images with an illumination unit 3, in which a multitude of light-emitting diodes 13 are used as light source 4. These are arranged inside a tunnel 12, so that the tunnel 12 is illuminated from the inside by the light emitting diodes 13. Preferably, one strip of LEDs 13 is located in each of the lower edges of the tunnel 12. The material of the tunnel 12 consists of a diffusely reflecting material or is coated on the inside with a diffusely reflecting material, so that a homogeneous illumination is created inside the tunnel. The tunnel 12 has essentially the shape of a half cylinder, with the open cut surface facing downwards to illuminate a so-called print repeat. This print repeat comprises the printed products and consists of a long web or a sheet, depending on what is used for a printing or finishing machine and what is to be printed. This print repeat is moved under the tunnel, preferably in a continuous movement. There is a slot 14 at the top of tunnel 12 to allow an image of the print repeat 2 to be taken from outside the tunnel.

As described at the beginning, the quality of the printed images must be checked on printing or finishing machines. This can be done semi or fully automatically with the apparatus). For the image acquisition itself, the image acquisition device has a camera 7 with a CMOS camera chip. This enables the definition of a variable image format. With a device, the camera 7 captures at least one strip with a number of lines N, whereby the number of lines N is selected relatively small. As can be seen from FIG. 1, the image strip intended for further processing is relatively narrow and is located in the center of the tunnel. In such a narrow area an almost ideal diffuse illumination can be realized, so that no reflections occur. A sufficiently wide slit and a sufficiently close camera positioning ensure that strips with a significantly higher number of lines or several strips with the number of lines N can also be captured.

In this example, the area optically detected or detectable by the camera is larger than the strip with the number of lines N, but the image captured by the camera 7 is further processed in such a way that only the strip with the number of lines N is processed. In this example, the number of lines N is 70, whereby a line height is typically 0.1 to 0.2 mm. The height of the captured image strip is thus 7 to 14 mm. For printed products that are less problematic with regard to reflections, a greater height could be selected, for example 30 mm corresponding to a line number of 150 to 300, depending on the height of a line. For very difficult materials such as holograms, the number of lines could also be reduced, for example 50, resulting in a strip width of 5 to 10 mm.

The camera 7 is connected to an evaluation device 8, which assembles the strip-shaped images captured by the camera 7 and provides an overall image of a larger area. The evaluation device 8 also uses inspection algorithms to identify defects in the printed products. Among other things, this is done by comparing the captured images with stored reference images. When executing the inspection algorithms, setting parameters are used to influence, for example, the sensitivity of defect detection. In order to guarantee a constant level of defect detection, it is necessary to validate the inspection algorithms. This involves checking whether defects are detected with the desired accuracy and, if necessary, adjusting the parameters in order to achieve the desired accuracy again.

Figure 2:
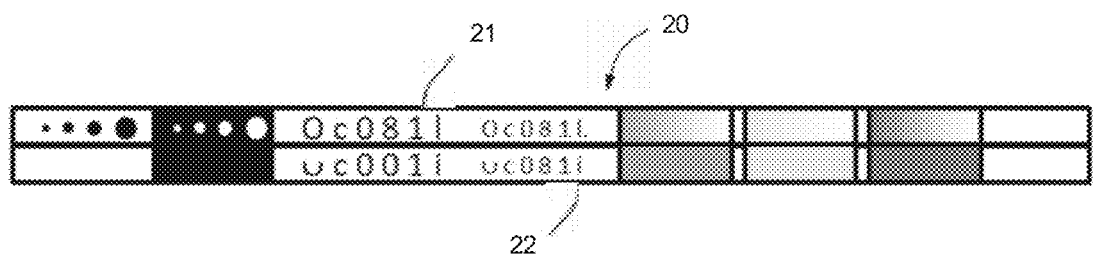
FIG. 2 shows a test pattern which can be used with the apparatus or method.

If a validation of the inspection algorithms is to be performed, a stencil with a test image is placed in the recording region 5 of the image acquisition device 3. This stencil can be designed as shown in FIG. 2. A first area 21 shows a faultless pattern, while a second area 22 shows a pattern with defects. The defects contained in the second pattern must be detected if the inspection algorithms works correctly. The defects may be that white or black dots are not recognized, that parts of letters or numbers are missing, whereby different sizes can be used here, or that color gradients are not recognized correctly. For example, it is possible that instead of a color gradient from dark to light, an even color was printed, which the apparatus for inspecting printed images must recognize.

During validation, the system checks whether the defects built into the second area are detected. If not, the parameters are re-adjusted until the error detection works as desired again. If no suitable parameterization can be found, it is possible that the unsufficient error detection is caused by e.g. contamination of a lens. The validation thus refers to internal influences such as the type of inspection algorithm and the choice of sensitivity parameters, as well as to external influences such as illumination, degree of soiling of the lens or any deflection mirrors. Under certain circumstances, such external influences can also be derived from the defect image. If, for example, defects in the left part of the test pattern are correctly detected, but defects in the right part are not, an external influence in the optical part of the image capture device 3 is obvious.

In different embodiments, the time for the execution of a validation follows a predefined time scheme or is triggered by sensor measurement values. In addition, it is conceivable that a validation of the inspection algorithms will be carried out with each web change.

For operation, it is particularly easy if simply the stencil is placed in the recording area and a control device 6 automatically recognizes that it is a test image and then switches to the validation mode.

In an alternative embodiment, the control device 6 takes over the "control" and requests an operator of the apparatus 1 for inspecting printed images to insert a stencil with a test image.

As mentioned above, a matrix camera 7 is used for the apparatus 1 for inspecting printed images. "Matrix camera" means that a two-dimensional image with several image lines is captured. This is different from frequently used line scan cameras, which only take one image line and produce an overall image by moving the printed product under the camera, so that several images of the line scan camera simply have to be lined up.

Figure 3:
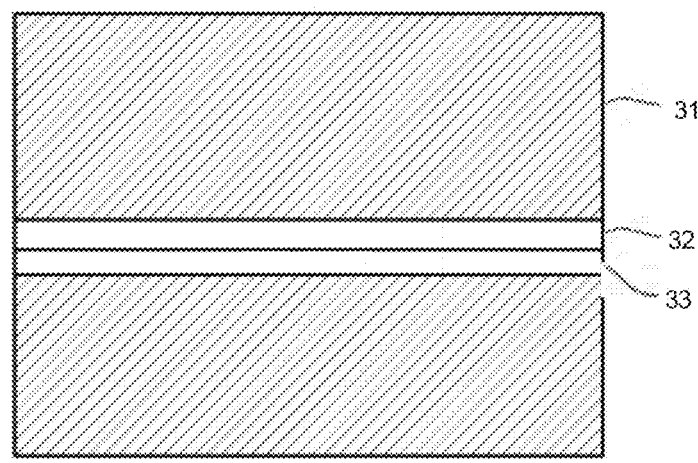
FIG. 3 shows a schematic representation of the extraction of strip images.

In this point, apparatus for inspecting printed images with matrix cameras differ fundamentally from line scan camera systems. This is because the image sensor of a matrix camera 7 provides a large-area image 31, as shown in FIG. 3. From this image 31, individual strips 32 and 33 are read out, each of which comprises several image lines. For example, the height of the individual strips is 5 to 12 mm.

During normal operation of a apparatus 1 for inspecting printed images, the strips are recorded and either evaluated individually or lined up together by image processing software to create an overall image. However, the image acquisition frequency is significantly lower than with a line scan camera, since each strip image already comprises several image lines.

In the apparatus 1 for inspecting printed images, the features of a matrix camera 7 are used, namely that two strip images can be recorded without moving a printed product or a test image under the camera 7. This is also shown in FIG. 3, where two strips are "cut out" from the entire recording region of an image sensor. The two strip images 32 and 33 are then compared with each other in the evaluation device 8 to determine whether the defects built into one of the strip images 32 or 33 are reliably detected.

In an advantageous embodiment, the two strip images 32 and 33 are captured in a single shot. In a modified embodiment, the strip images are acquired in separate images. It is possible to use adjacent areas in the recording region, as shown in FIG. 3, or to use the same area in recording region 5 and move the test pattern stencil by one strip width for a second acquisition. The matrix camera is also advantageous in the second variant, because no continuous movement of the test stencil is required for simultaneous image acquisition.

The validation procedure is explained below by means of a description of the methods.

In a first embodiment of a method, inspection algorithms are validated by placing in a first step a stencil in the recording region 5 of the apparatus 1 for inspecting printed images. The stencil has a first area 21 with a first pattern and a second area 22 with a second pattern, the first pattern having a defined deviation from the second pattern. Then, in a second step, a first multi-line strip image 32 is acquired, whereby at least a section of the first pattern is captured. In a third step, a second strip image 33 is recorded, whereby at least a section of the second pattern is detected. The two strip images can be acquired simultaneously, so that the second and third step coincide, or one after the other. Then, in a fourth step, the two strip images 32 and 33 are compared with each other and evaluated to determine whether the deviations between the first and the second pattern are detected.

If the first and second strip images 32 and 33 are acquired in a single shot, i.e. simultaneously, the position of the stencil for the first and second images is unchanged. Therefore, the selected area of the recording region of camera 7 must be shifted for the first and second image. If, on the other hand, the selected area of the camera is not to be changed, the stencil must be moved between a first and a time-staggered second image.

In order to facilitate positioning of the stencil, an advantageous embodiment provides a guide in the recording region 5 into which the stencil can be inserted for the validation procedure. This can be realized by a groove. A guide can also be used to facilitate moving of the stencil between a first and a second position by aligning the stencil at a first stop for the first acquisition and at a second stop for a second acquisition. This can be a left and right edge of a groove.

On the side of the evaluation device 6, an exact physical alignment of the stencil can be replaced by recognizing the position of a "somehow" inserted stencil and defining the sections of the recording region to be evaluated accordingly.

Figure 4:
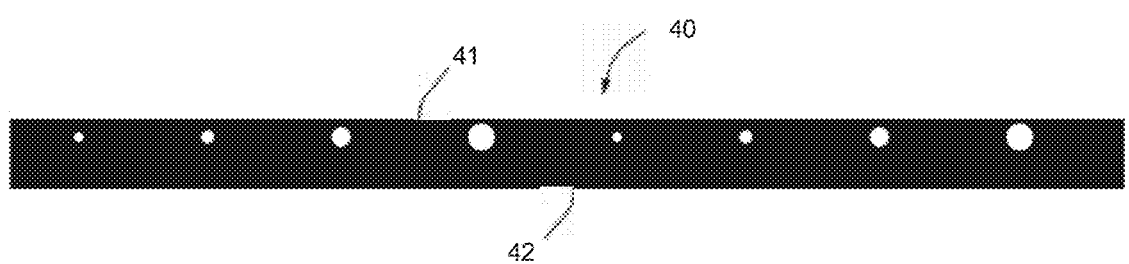
FIG. 4 shows a test pattern for a surface inspection with hole detection.

The apparatus for inspecting printed images is also suitable for surface inspection. In a surface inspection, for example, it is checked whether a product has holes. For this purpose, backlighting is used to check whether bright spots can be seen on the surface. A stencil 4o with a test pattern for a surface inspection is shown in FIG. 4. Holes of various sizes are made in an upper area 41 of stencil 40, which must be detected by the apparatus 1 for inspecting printed images. It would be faulty if such bright points were not detected, as in the lower area 42 of the test image. These two areas would now be recorded and compared as a strip image, so that it can be determined whether holes of different sizes are detected or not.

The invention is not limited to comparing exactly two strips. Test images with more than two strips could also be used, which are then evaluated.

The invention claimed is:

1. An apparatus comprising:
   an image acquisition device with at least one camera, the image acquisition device configured to acquire a multi-line section of a recording region; and
   an evaluation device configured to:
   process at least two sub-areas of the multi-line section as one strip image each, and
   compare at least two strip images of a test pattern to each other in a validation mode to check whether deviations of the strip images are detected
   wherein the apparatus is configured to inspect printed images of a printing or finishing machine with continuously moving printed products.

2. The apparatus according to claim 1, wherein the at least two strip images are acquired in a single shot.

3. The apparatus according to claim 1, further comprising a control device configured to set the evaluation device into the validation mode according to a predetermined time scheme.

4. The apparatus according to claim 1, further comprising a control device configured to set the evaluation device into the validation mode on basis of sensor measurement values.

5. The apparatus according to claim 1, further comprising a control device configured to set the evaluation device into the validation mode during a web change.

6. The apparatus according to claim 1, further comprising a control device configured to set the evaluation device into the validation mode upon recognition of the test pattern.

7. The apparatus according to claim 1, wherein the evaluation device is configured to perform a fault cause analysis based on a type of deviation.

8. The apparatus according to claim 1, wherein a height of a strip image is 5 to 12 mm inclusive.

9. The apparatus according to claim 1, further comprising a guide for an inserted test pattern stencil.

10. The apparatus according to claim 1, wherein the evaluation device is configured to perform a validation on basis of a standing image.

11. The apparatus according to claim 10, wherein the evaluation device is configured to perform the validation on the basis of a stencil with a test image which is placed in the recording region of a print image inspection.

* * * * *